(12) United States Patent
Wilson et al.

(10) Patent No.: US 9,715,887 B2
(45) Date of Patent: Jul. 25, 2017

(54) MAGNETIC RECORDING SYSTEM USING PATTERN DEPENDENT WRITER HAVING REGISTER PAGES FOR STORING WRITE CURRENTS

(71) Applicant: Avago Technologies General IP (Singapore) Pte. Ltd., Singapore (SG)

(72) Inventors: Ross S. Wilson, Menlo Park, CA (US); Peter J. Windler, Fort collins, CO (US); Bruce A. Wilson, San Jose, CA (US); Jaydip Bhaumik, Longmont, CO (US); Scott M. O'Brien, Mendota Heights, MN (US); Jason P. Brenden, Woodbury, MN (US); Jeffrey A. Gleason, Mendota Heights, MN (US); Cameron C. Rabe, Mendota Heights, MN (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/979,643

(22) Filed: Dec. 28, 2015

(65) Prior Publication Data

US 2017/0186448 A1    Jun. 29, 2017

(51) Int. Cl.
| G11B 5/09 | (2006.01) |
| G11B 5/012 | (2006.01) |
| G11B 20/10 | (2006.01) |
| G11B 5/02 | (2006.01) |
| G11B 5/00 | (2006.01) |

(52) U.S. Cl.
CPC ............... *G11B 5/09* (2013.01); *G11B 5/012* (2013.01); *G11B 5/02* (2013.01); *G11B 20/10009* (2013.01); *G11B 2005/0013* (2013.01); *G11B 2005/0016* (2013.01)

(58) Field of Classification Search
None
See application file for complete search history.

(56) References Cited

U.S. PATENT DOCUMENTS

| 6,310,740 B1 * | 10/2001 | Dunbar | G11B 5/012 |
| | | | 360/46 |
| 6,337,778 B1 * | 1/2002 | Gagne | H03L 7/18 |
| | | | 360/46 |

(Continued)

OTHER PUBLICATIONS

U.S. Appl. No. 14/977,595, filed Dec. 21, 2015 Bruce A. Wilson Unpublished.

*Primary Examiner* — Tan X Dinh
(74) *Attorney, Agent, or Firm* — Sheridan Ross P.C.

(57) ABSTRACT

A storage system includes a magnetic write head, a magnetic storage medium, a channel circuit comprising a write data output, wherein the channel circuit is operable to process write data to be recorded on the magnetic storage medium by the magnetic write head, and a preamplifier operable to receive the write data from the channel circuit, wherein the preamplifier comprises a number of register pages configured to store pattern dependent write current characteristics for a variety of magnet lengths, and wherein the preamplifier is operable to retrieve the write current characteristics based on magnet lengths and to record data bits on the magnetic storage medium using the write current characteristics.

20 Claims, 6 Drawing Sheets

(56) References Cited

U.S. PATENT DOCUMENTS

| | | | |
|---|---|---|---|
| 7,355,804 B1* | 4/2008 | Kassab | G11B 5/02 360/46 |
| 8,315,128 B1 | 11/2012 | Wilson et al. | |
| 8,390,314 B2 | 3/2013 | Dang et al. | |
| 8,625,231 B1* | 1/2014 | Dhanda | G11B 5/02 360/75 |
| 8,792,197 B1* | 7/2014 | Wilson | G11B 5/02 360/46 |
| 8,854,936 B1 | 10/2014 | Maul et al. | |
| 8,929,013 B1* | 1/2015 | Mastrocola | G11B 20/10222 360/46 |
| 9,030,770 B2 | 5/2015 | Contreras et al. | |
| 2007/0146922 A1* | 6/2007 | Okada | G11B 5/09 360/67 |
| 2010/0046597 A1* | 2/2010 | Farjad-rad | H04L 25/03019 375/232 |
| 2010/0064091 A1* | 3/2010 | Futenma | H04N 19/423 711/5 |
| 2012/0243390 A1 | 9/2012 | Lennard et al. | |
| 2013/0128375 A1* | 5/2013 | Livshitz | G11B 5/02 360/48 |
| 2014/0064404 A1 | 3/2014 | Gonzalez | |
| 2015/0062737 A1* | 3/2015 | Wilson | G11B 20/1254 360/48 |
| 2015/0213813 A1* | 7/2015 | Lammers | G11B 20/10018 360/46 |
| 2015/0318014 A1* | 11/2015 | Wilson | G11B 20/10027 360/46 |

* cited by examiner

MAGNETIC RECORDING SYSTEM USING PATTERN DEPENDENT WRITER HAVING REGISTER PAGES FOR STORING WRITE CURRENTS

FIELD OF THE INVENTION

Various embodiments of the present invention provide systems and methods for a pattern dependent writer in a magnetic recording system and for systems and methods of communicating with a writer preamplifier.

BACKGROUND

Various magnetic recording systems such as hard disk drives utilize a write head to record data on a magnetic medium. Data to be recorded is provided to the write head coil as an alternating electrical current. The electrical current passes through a metallic coil wrapping around the write head, generating a magnetic field. The magnetization state of a pole tip in the write head is switched by the magnetic field. As the magnetized pole tip is passed over the magnetic storage medium, for example a spinning disc with a ferromagnetic coating, the magnetization of regions of the magnetic medium below the pole tip are altered and can later be read back to retrieve the data.

The write (recording) process is challenging at high speeds in magnetic recording. Conventionally, write current waveforms are delivered with pattern-independent levels and time-domain properties. However, the switching response of the magnetic system is not linear. The non-linearity between excitation and response signals is more pronounced as the data rate increases and the bit sequence includes more high frequency transitions. As a result, the global recording performance degrades, and data rate and areal density are limited.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components.

DETAILED DESCRIPTION OF THE INVENTION

Various embodiments of the present invention provide systems and methods for a pattern dependent writer in a magnetic recording system and for systems and methods of communicating with a writer preamplifier, improving areal density and error-rates. In such a writer, one or more characteristics of the write current through the pole tip are controlled based in part on the data pattern being written. For example, pattern dependent write-current (PDW) overshoot amplitude control is used in some embodiments to improve recording quality, hence areal density and bit-error-rate. During recording of closely-spaced magnetic transitions of short run-lengths, say 1T or 2T, where T is the fundamental bit interval, the magnetic state of the head's pole-tip will have insufficient time to become magnetically saturated. An aggressive write current overshoot setting can then be used to drive the pole tip quickly from one saturated state to the opposite saturated state. Less aggressive settings are used for longer prior run-lengths. In respect of the recorded magnets, the short run length cases favor use of an aggressive overshoot setting for faster magnetic switching. Thus, it is beneficial to provide means of dynamically varying writer parameters for 1T magnets as a function of run-length of present and adjacent bit cells. The same arguments and benefits also pertain to some extent to 2T-length magnets, or to particularly troublesome other transition lengths.

Write head switching is a particularly complicated process that affects overall recording performance in magnetic recording systems. Switching of a pole tip in the write head is initiated by the magnetic field from a coil wrapped around the pole tip. Rapid switching of the pole tip magnetization is a bottleneck for a fast write process. The write current passing through the coil and the magnetization state of the pole tip (and, hence, the magnetic field affecting switching of the bits on the disk platter) are related non-linearly due to the characteristics of the magnetic medium and the intrinsic time scale of the magnetization process. As a result, magnetic flux shape can differ significantly from that of the write current; and exhibits a dependence on transition history. Modification of write current characteristics is beneficial in compensating recording head and medium dynamics. Such characteristics can be controlled in the magnetic recording system disclosed herein to improve recording quality.

Some embodiments of the pattern dependent writer disclosed herein treat 1T and 2T or other magnet lengths separately. One or more characteristics of the write current such as, but not limited to, overshoot amplitude, write current level, or write-current risetime, are stored in register pages or other storage means in a preamplifier writer. Each page is associated with a specific transition length; and contains a set of registers describing write current parameters applicable to that transition length. A default page is invoked for all other transition lengths. Write current parameters not specified in a given page are taken from the appropriate register in the default page. Pattern dependent write current parameter switching for different magnet lengths is referred to herein as extended pattern dependent write current support. In some embodiments, the pattern dependent writer is also adapted to reduce or minimize the number of signals required for preamplifier writer to channel communication and to support tradeoffs between number of signals and timing margin.

Figure 1:
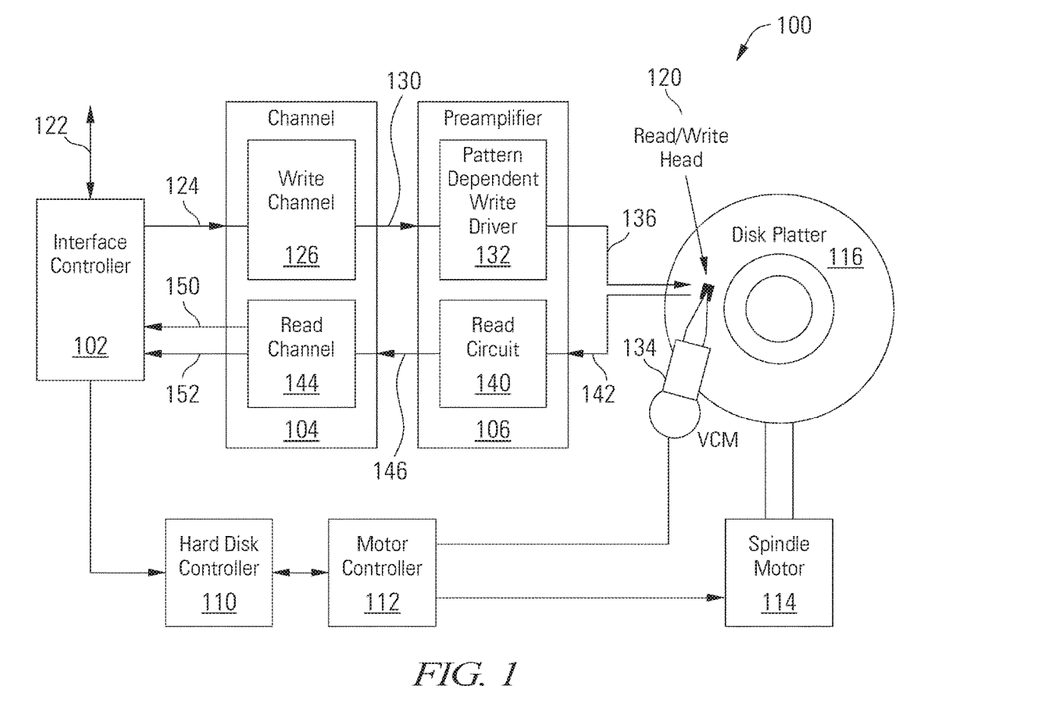
FIG. 1 depicts a magnetic storage system including a write channel circuit, preamplifier and write head in accordance with some embodiments of the present invention.

Turning to FIG. 1, an example application of the extended pattern dependent writer is a magnetic storage system 100 such as the hard disk drive illustrated in FIG. 1. Storage system 100 includes an interface controller 102, channel circuit 104, preamplifier 106, a hard disk controller 110, a motor controller 112, a spindle motor 114, a disk platter 116, and a read/write head assembly 120. Interface controller 102 controls addressing and timing of data to/from disk platter 116. The interface controller 102 may include devices such as a processor, buffer memory, format control, error correction circuits, and interface circuits. The data on disk platter 116 consists of tracks of magnetic information that may be written and detected by read/write head assembly 120 when the assembly is properly positioned over disk platter 116. In one embodiment, disk platter 116 includes magnetic signals recorded in accordance with either a longitudinal or a perpendicular recording scheme.

In a typical write operation, interface controller 102 receives digital data 122 to be stored on the disk platter 116 and provides corresponding digital write data 124 to a write channel 126 in the channel circuit 104. The digital data 122 may be received in serial form on a standardized device interface such as a Serial Advanced Technology Attachment (SATA) interface. During write operations, the digital data 122 is stored in a local buffer memory, formatted and augmented with error correction codes.

Write channel 126 may process the digital write data 124 in a number of ways, such as serializing the data, modulation coding the data and adding parity bits, serializing the data at the desired bit-rate, and performing write precompensation. The write channel 126 provides encoded write data 130 to a write driver 132 in preamplifier 106. In some embodiments, the write channel 126 also provides a clock or a pattern dependent write page selection signal to the preamplifier 106, depending on a page selection mode that determines how register pages containing pattern dependent write parameters are selected in the preamplifier 106.

In some embodiments, the preamplifier 106 is mounted on an actuator arm 134, and the encoded write data 130 and clock or pattern dependent write page selection signal are driven from the channel circuit 104 by a transmitter and delivered over a flexcircuit in differential positive emitter-coupled logic (PECL) format or any other suitable format to the write driver 132 in the arm-mounted preamplifier 106. The preamplifier 106 converts the encoded write data 130 to an analog signal, performs waveshaping, adds overshoot pulses or controls other write current parameters to aid the recording process, and impresses in the write head portion of read/write head assembly 120 a bipolar programmable write current 136 of polarity determined by that of the PECL input.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). A read circuit 140 in the preamplifier 106 establishes a bias current in the magneto-resistive write head on read/write head assembly 120. Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal 142 representative of the magnetic data on disk platter 116. This minute analog signal 142 is transferred from read/write head assembly 120 to read circuit 140 in the preamplifier 106, where it is amplified and is conveyed to a read channel 144 in the channel circuit 104 as analog read data 146. In turn, read channel 144 decodes and digitizes the received analog signal to recreate the user data originally written to disk platter 116, as well as to extract servo information.

As part of processing the analog read data 146, read channel circuit 144 may perform one or more operations such as analog filtering, variable gain amplification, analog to digital conversion, equalization, timing recovery, data detection, decoding, deserialization, and servo demodulation to obtain the user data and servo information. The user data is provided by read channel 144 as digital read data 150 to the interface controller 102, where it is error-corrected, stripped of special formatting fields, and reassembled in buffer memory for transmission to a user device as digital data 122.

Figure 2:
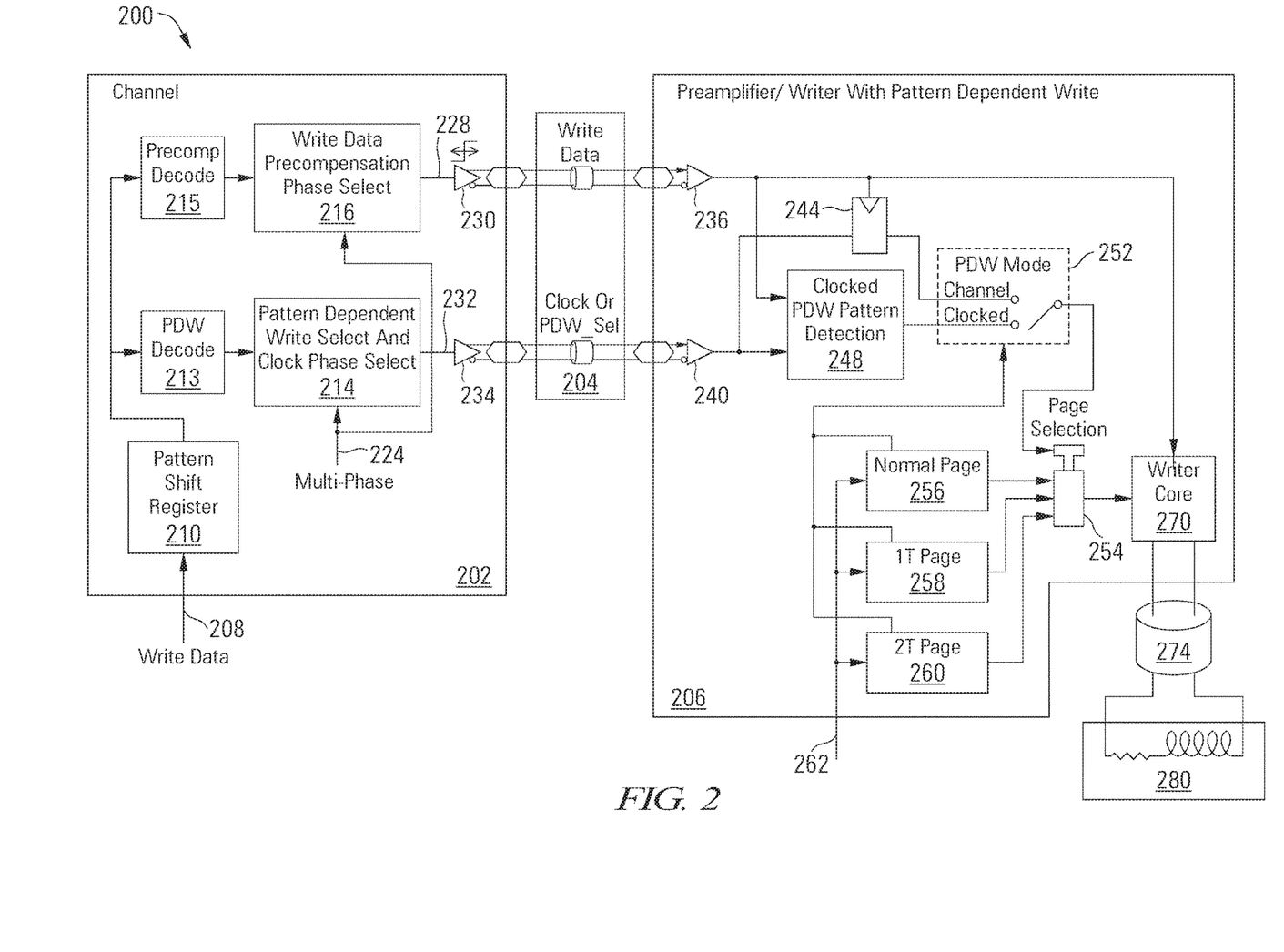
FIG. 2 depicts a channel and preamplifier writer with pattern dependent write current parameter switching and multi-mode pattern dependent write current parameter page selection in accordance with some embodiments of the present invention.

Turning to FIG. 2, a magnetic recording system 200 is depicted including a channel 202 and preamplifier/writer 206 with pattern dependent write current parameter switching and multi-mode pattern dependent write current parameter page selection in accordance with some embodiments of the present invention. The preamplifier/writer 206 is operable to process write data for writing by a write head 280 during write operations and to amplify analog readback signals during read operations. Three parameter register pages 258, 260, 256 are provided in the preamplifier/writer 206, one for each magnet length of interest, for example 1T, 2T, and Normal, respectively. The pages 256, 258, 260 are initialized appropriately by the system controller, say by means of a low-speed serial port 262, prior to onset of a write operation. During a write operation, page selection occurs in accordance with magnet length in the serial write data (WD) 228 emitted by the channel 202. The above magnet length assignment is arbitrary, other lengths can be chosen, or pages can be assigned to particular magnet sequences.

The example embodiment of a magnetic recording system 200 depicted in FIG. 2 supports two mutually exclusive page selection modes, controlled by a static control signal:

1. Clocked Mode. The channel 202 provides a continuous clock 232 synchronous to write data 228, in addition to write data 228. In some embodiments, the clock period is 2T, with edges spaced at 1T intervals. Within the preamplifier/writer 206, write data 228 are strobed by the clock 232 into a shift register 244 from which magnet lengths are decoded and page selection controlled.

2. Channel Mode. The channel 202 provides a page selection signal (PDW_Sel) 232 in addition to write data 228. The page selection signal 232 is retimed to write data 228 within the preamplifier/writer 206, and the result controls page selection. The page selection signal 232 can be encoded in any suitable manner, such as the example embodiments disclosed hereinafter, in order to obtain the three-state signaling to select one of three pages 256, 258, 260. No clock signal is required in the channel mode. The page selection signal 232 can occupy one or two lines in order to trade off between line count and signaling margin, as described below.

Notably, the secondary conductor or conductors on the flexible cable 204 between the channel 202 and preamplifier/writer 206 carry a signal or signals 232 that in the clocked mode comprise a clock signal, and in the channel mode, comprise a page selection signal(s) PDW_Sel. Thus, signal 232 is referred to herein as both a clock 232 or a page selection signal 232 depending on the current page selection mode. The write data signal 228 and clock/page selection signal 232 employ differential signaling in some embodiments for noise immunity. Differential transmitters and receivers 230, 236, 234, 240 are thus included in the channel 202 and the preamplifier/writer 206 in some embodiments. Rising and falling transitions in the write data are defined, respectively, as negative-to-positive and positive-to-negative excursions of the differential write data signal.

The method of switching between clocked mode and channel mode is depicted in block 252 of FIG. 2. Switch 252 routes the page-selection signal from the selected source, to multiplexor 254, which performs page selection. The page-selection mode can be selected in any suitable manner, for example based on user programming. The selection of a page 256, 258, 260 can also be performed in any suitable manner, such as according to the following rules:

Select 1T page 258 if present transition length=1T
Else select 2T page if present transition length=2T
Else select Normal page 256

More complex selection schemes which qualify 1T and 2T page selection based on prior/later patterns are possible. Thus, for example, it could be stipulated that only the first 1T or 2T of a run of like transitions be boosted.

Figure 3:
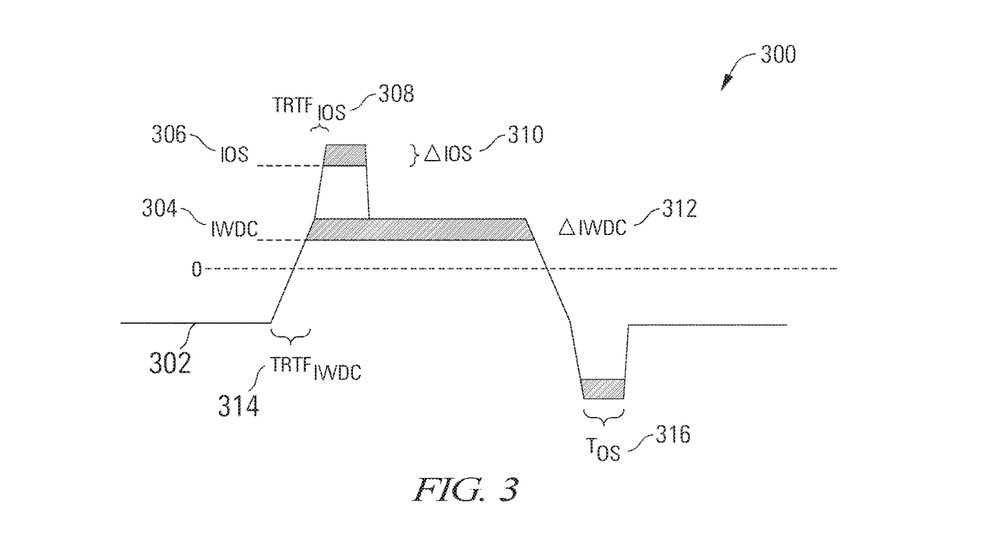
FIG. 3 depicts various write current characteristics for an example waveform that can be controlled using extended pattern dependent write current parameter switching and multi-mode parameter page selection in accordance with some embodiments of the present invention.

In some embodiments, page selection occurs at the write data bit rate in both page selection modes. Page select determination, whether located in the Preamplifier (Clocked mode) or in the Channel (Channel Mode) is accomplished using a shift register and present/prior/succeeding bit examination logic. Parameters within the selected page 256, 258 or 260 are multiplexed by multiplexer 254 to the writer core 270, where they establish one or more write current characteristics such as, but not limited to, DC write current IWDC 304 (see waveform 300, FIG. 3), delta DC write current ΔIWDC 312, overshoot current IOS 306, delta overshoot current ΔIOS 310, IWDC rise/fall time $TRTF_{IWDC}$ 314, IOS rise/fall time $TRTF_{IOS}$ 308, and overshoot pulsewidth $T_{OS}$ 316 of the bit being written. As a non-limiting example, in some embodiments the normal page register 256 contains registers specifying all variable write current parameters: IOS, IWDC, $TRTF_{IOS}$, $TRTF_{IWDC}$, and $T_{OS}$. The 1T page register 258 contains one or more of Δ±IOS, Δ±IWDC, $\Delta TRTF_{IOS}$, $\Delta TRTF_{IWDC}$, and $T_{OS}$ parameter registers applicable to 1T magnet length. The 2T page register 260 contains one or more of Δ±IOS, Δ±IWDC, $\Delta TRTF_{IOS}$, $\Delta TRTF_{IWDC}$, and $T_{OS}$ parameter registers applicable to 2T magnet length. If a page 258 or 260 omits a parameter register present in the Normal page 256, that parameter may be programmatically selected from another page in which it is present. Write current transitions written in a conventional manner are referred to as "Normal", whereas those written with modification are referred to as "Boosted". Two boost levels are provided in some embodiments, commonly associated with 1T (minimum-length) and 2T magnet durations. T denotes the minimum-width bit interval, where T≡1/data rate.

Writer output current is delivered from writer core 270 on pins WDX/WDY to a flex-on-suspension transmission line 274, and thence to the write head 280.

Since Write and Read operations are mutually exclusive, in some embodiments pattern-dependent write-related signals are multiplexed on the same signal conductors as read data on the preamplifier to channel interface 204 to reduce the number of signals required in clocked and channel page selection modes.

Within the channel 202, the write data 228 can be generated in any suitable manner. In some embodiments, a pattern shift register 210 and pattern logic 215 in a write data precompensation phase select circuit 216 recognize write-precompensatable patterns in write data 208 and select an appropriate element of multiple clock phase buss 224 to achieve the desired write data transition shifts. In some embodiments, clock phase buss 224 is generated by a phase interpolator driven by quadrature clocks from a write phase-locked loop.

The use of write precompensation to counter nonlinear transition shift (NLTS) is well-known.

In the clocked page selection mode, a uniform 2T-period clock signal 232 is produced by the pattern dependent write select and clock phase select circuit 214, with transitions occurring nominally midway between transitions of the write data 228. In some embodiments, the phase of the clock signal 232 is shifted a programmable amount relative to the write data 228 by a pattern dependent write select and clock phase select circuit 214 in order to assure proper setup/hold times on the clocked pattern dependent write pattern detection circuit 248 in the preamplifier/writer 206. Shifting is performed by selecting an appropriate phase from multi-phase clock buss 224. Note that, unlike for write precompensation, selection is pattern-independent.

In channel page selection mode, the page selection signal PDW_Sel 232 is signalled by the pattern dependent write select and clock phase select circuit 214 when 1T or 2T magnet lengths are observed in the pattern shift register 210 by pattern dependent write decode logic 213. As with the clock signal 232 in clocked page selection mode, the phase relationship between page selection signal PDW_Sel 232 and write data 228 can be varied programmatically to assure reliable retiming to write data 228 in the preamplifier/writer 206. In some embodiments, the page selection signal PDW_Sel 232 nominally straddles edges in the write data 228. The foregoing description of generation of the write data signal 228, clock signal 232 in clocked page selection mode, and the page selection signal PDW_Sel 232 in channel page selection mode is merely exemplary and does not limit scope of the invention. Based on the disclosure herein, one of ordinary skill in the art will recognize a variety of circuits and techniques that can be used to generate and apply precompensation as desired to the write data signal 228, the clock signal 232 in clocked page selection mode, and the page selection signal PDW_Sel 232 in channel page selection mode in accordance with various embodiments of the present invention.

Figure 4:
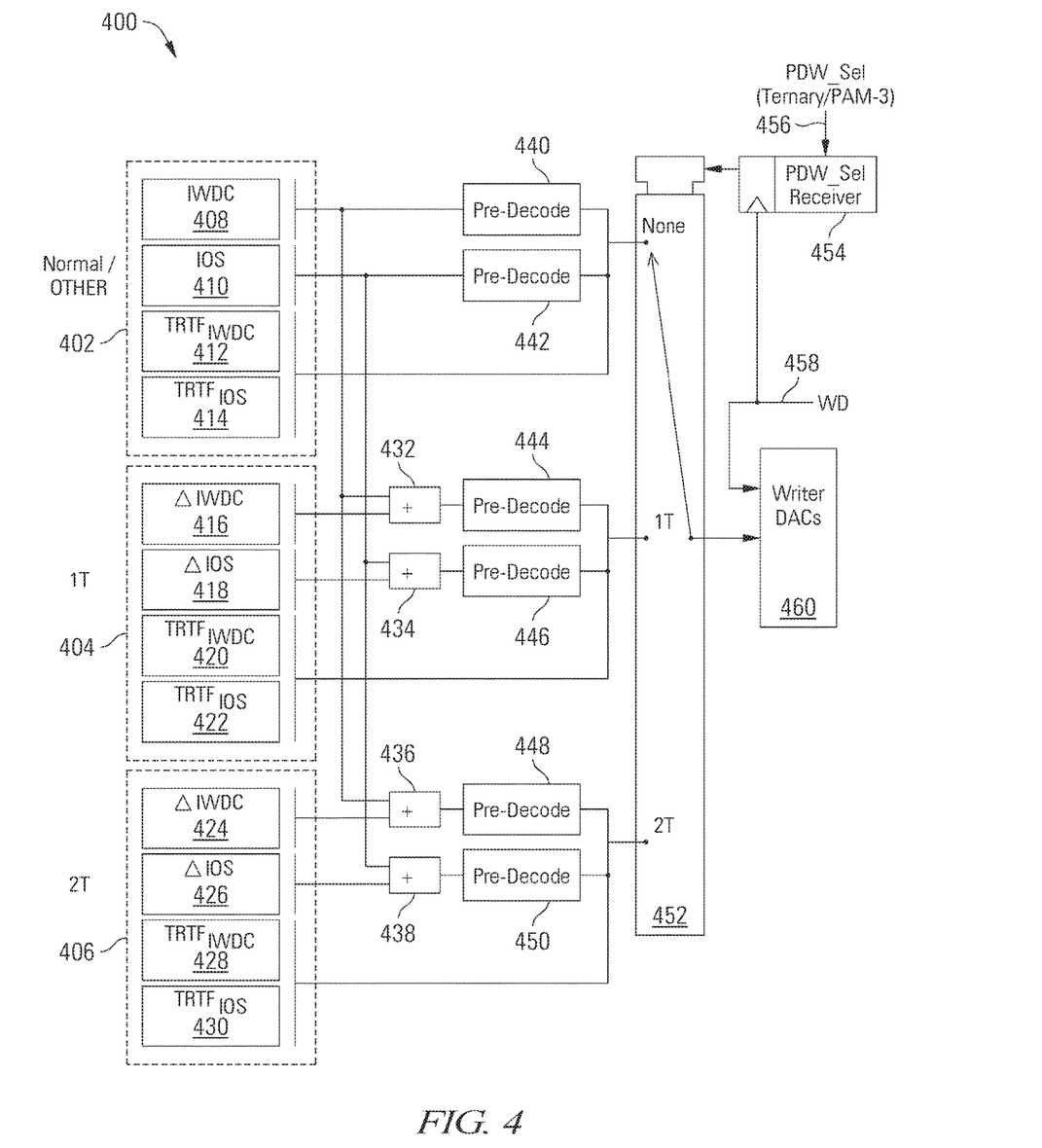
FIG. 4 depicts an example write current parameter page switching circuit in accordance with some embodiments of the present invention.

Turning to FIG. 4, an example write current parameter page switching circuit 400 is depicted in accordance with some embodiments of the present invention. Individual parameter values are stored in register pages 402, 404, 406, which can be a group of relatively slow registers, and which are loaded in some embodiments by a system control microprocessor using a conventional serial port protocol such as SPI or I²C.

Any necessary pre-decoding, for example writer output segment digital-to-analog converter (DAC) decoding, is performed in pre-decoders (e.g., 440, 442, 444, 446, 448, 450) which can be implemented in slow logic at the register page outputs. In some embodiments, parameters from multiple register pages can be combined, for example in combining circuits 432, 434, 436, 438, for example enabling storage of base parameters such as IWDC 408 and IOS 410 in a Normal or Other register page 402 and parameter value deltas such as Δ±IWDC 416, 424 and Δ±IOS 418, 426 in the 1T register page 404 and 2T register page 406. Customized values of other parameters such as $\text{TRTF}_{IWDC}$ 412, 420, 428 and $\text{TRTF}_{IOS}$ 414, 422, 430 can be stored in every register page 402, 404, 406. Again, however, this is merely an example, and any number of write current parameters can be stored in each register page 402, 404, 406. Furthermore, some register pages (e.g., 406) may contain fewer write current parameters than some other register pages (e.g., 402) in some embodiments.

The pre-decoded information is delivered to a fast multiplexor 452 operating at the write data bit rate, where pages are switched into the writer core 460 in channel mode under influence of the page selection signal PDW_Sel 456 which originates in the channel, and is received by receiver 454. Prior to application to the multiplexor 452, a pair of meta-stability-hardened D-flip flops (DFF) within receiver 454 clocked by the write data signal WD 458 retimes the page selection signal PDW_Sel 456. In clocked mode, multiplexor selection signals originate locally in clocked PDW pattern detection block 248 of FIG. 2.

In order for the channel to control selection in the pre-amplifier of three pattern dependent write parameter pages, three states are conveyed on the page selection signal PDW_Sel 456 line(s), whether using multiple conductive lines or a multi-state ternary signal such as, but not limited to, a 3-level pulse-amplitude modulated signal, or PAM-3 signal. In some embodiments, the page selection signal PDW_Sel 456 is re-timed in all page selection modes by write data 458 in the preamplifier, as write data edges precisely define recorded magnet boundaries and convey write precompensation information.

Figure 5:
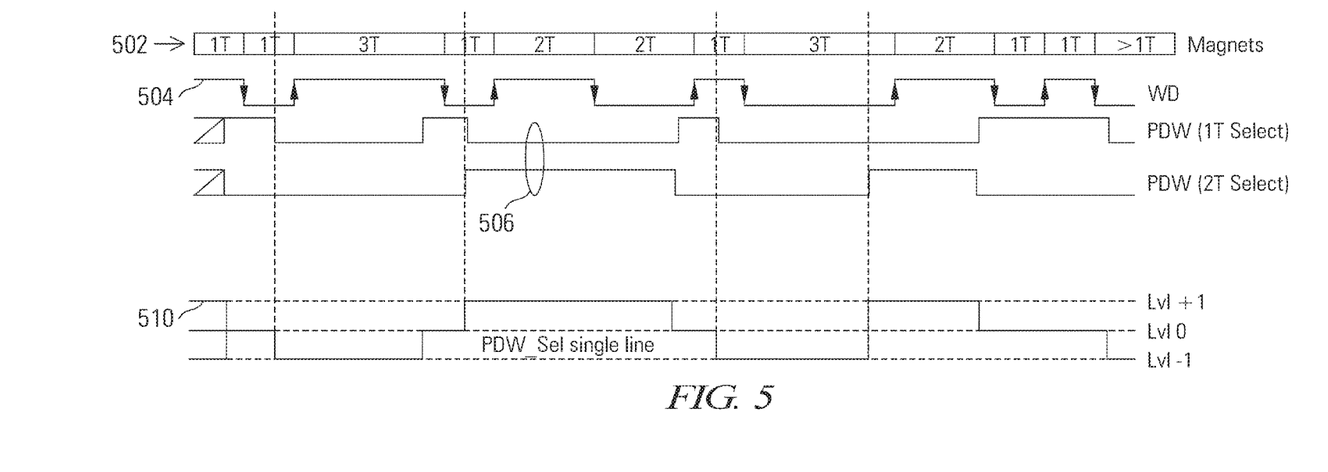
FIG. 5 is a magnet and timing diagram for a page selection signal using a differential two-bit buss and a PAM-3 ternary signal in accordance with some embodiments of the present invention.

Turning to FIG. 5, a magnet and timing diagram for a page selection signal on the channel-to-preamplifier writer interface is depicted using a single PAM-3 ternary signal in accordance with some embodiments of the present invention. In some cases, the PAM-3 signal is transmitted differentially. A sequence 502 of 1T, 2T and 3T recorded magnets is shown with a corresponding write data signal 504. The channel signals the magnet length to the preamplifier using the PAM-3 PDW_Sel page selection signal 510. In the example embodiment of FIG. 5, the channel can signal one of three pattern dependent write states to the preamplifier, Normal, 1T or 2T. The write data signal 504 edge timing varies or jitters with precompensation, and the page selection signal is retimed accordingly based on the write data signal. In FIG. 5, boost of a 1T transition (select 1T register page) is signaled by one of three possible PAM-3 (ternary) levels 0; level +1 signals boost of a 2T transition (select 2T register page); and level −1 signals no boost (select Normal register page). Assignment of levels to transition lengths is arbitrary.

For convenience, internal writer page-selection signals 506 are also shown in FIG. 5; these are derived in the writer by comparing the incoming PAM-3 signal against two thresholds, one centered between levels 0 and +1, the other between levels 0 and −1. It is apparent from FIG. 5 that setup and hold time of PAM-3 510 relative to nominal write data 502 edges is ±T/2.

In FIG. 5, the PAM-3 PDW_Sel signal state persists until a state change is required. A simpler implementation in the channel can be achieved in some cases if signal state is required to persist only ±T/2 relative to the associated write data edge.

Although the waveforms in FIG. 5 and others herein assume that all same-length magnets are treated identically, it is possible to apply pattern dependent write characteristics only to the first magnet or to other patterns.

The 1T select signal of pair 506 is asserted during transitions on the write data signal WD 504 to a 1T magnet, to select pattern dependent write characteristics from the 1T register page. The 2T select signal of pair 506 is asserted during transitions on the write data signal WD 504 to a 2T magnet, to select pattern dependent write characteristics from the 2T register page. Both signals of signal pair 506 remain deasserted during transitions on the write data signal WD 504 to magnets other than 1T or 2T, such as 3T magnets or longer, to select pattern dependent write characteristics from the Normal or Other register page.

As shown in FIG. 5, the page selection signal PDW_Sel 506 changes state in worst case about T/2 in advance of the corresponding transition in the write data signal WD 504, and persists about T/2 thereafter. Relative timing between the page selection signal PDW_Sel 506 and the write data signal WD 504 timing is controlled to achieve highest setup and hold margins in the retiming flip-flop which resynchronizes the page selection signal PDW_Sel 506 to the write data signal WD 504 in the preamplifier/writer. Worst-case timing occurs if a 1T magnet precedes a second magnet of any length; in this case the page selection signal PDW_Sel 506 changes state approximately in the middle of the initial 1T cell, that is, ∼T/2 ahead of the second magnet. In the case of an initial ≥2T magnet, the change may occur ∼T ahead.

In some embodiments, the page selection signal is carried by a PAM-3 ternary signal 510 which uses multi-level signaling. For example, the PAM-3 ternary signal 510 can have level 0 to signal 1T select, level +1 to signal 2T select, and level −1 otherwise to signal Normal register page select. An optimal PAM-3 state assignment minimizes the amplitude excursions between levels at adjacent magnets. A state assignment −1=(magnet≥3T); 0=(magnet=1T); +1=(magnet=2T) yields the following table:

TABLE 1

| Present magnet | Available transition time | Next magnet | PAM-3 state change |
|---|---|---|---|
| 1T | T/2 | 1T | 0 → 0 |
| | | 2T | 0 → +1 |
| | | ≥3T | 0 → −1 |
| 2T | 1T | 1T | +1 → 0 |
| | | 2T | +1 → +1 |
| | | ≥3T | +1 → −1 |
| ≥3T | ≥1T | 1T | −1 → 0 |
| | | 2T | −1 → +1 |
| | | ≥3T | −1 → −1 |

It can be seen in table 1 that the worst-case level excursions −1↔+1 are now always associated with a 1T available transition time, although the assigned values in FIG. 5, for clarity, do not obey this assignment. The page selection signaling concept can be extended to additional page-counts; for example, four pages can be supported with quaternary (PAM-4) signaling.

Again, the page selection signaling schemes of FIG. 5 involve transitions in PAM-3 PDW_Sel signal 510 and internal page selection signal pair 506 to occur nominally T/2 ahead of write data WD signal transitions in the worst case. As a result, to achieve the needed page selection signal to write data phasing in some embodiments closed-loop skew compensation is used.

In some embodiments, it may be desired to transmit the page-selection signal to the Preamplifier using PAM-2/NRZ signaling. In this case, two (possibly differential) signals are required. In this case, signals 506 in FIG. 5 may be generated directly in the channel. As with the PAM-3 case, setup/hold margin relative to write data 502 is ~±T/2. Other page selection signaling schemes to the Preamplifier can also be used, which may provide different numbers of possible states and register pages. For example, if two PAM-2 signals are used, four states (register pages) would be possible.

Figure 6:
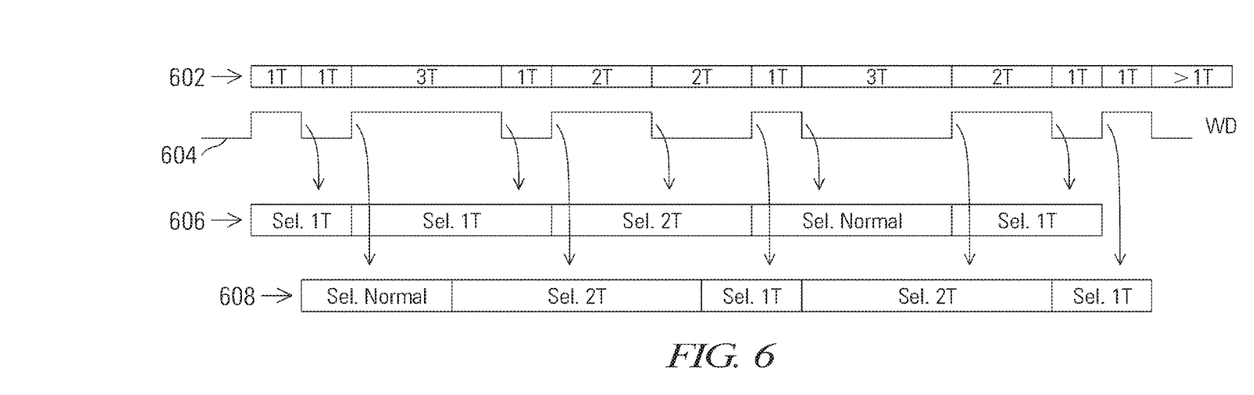
FIG. 6 is a magnet and timing diagram for a two-lane PAM-3 page selection signal in accordance with some embodiments of the present invention.
Figure 7A:
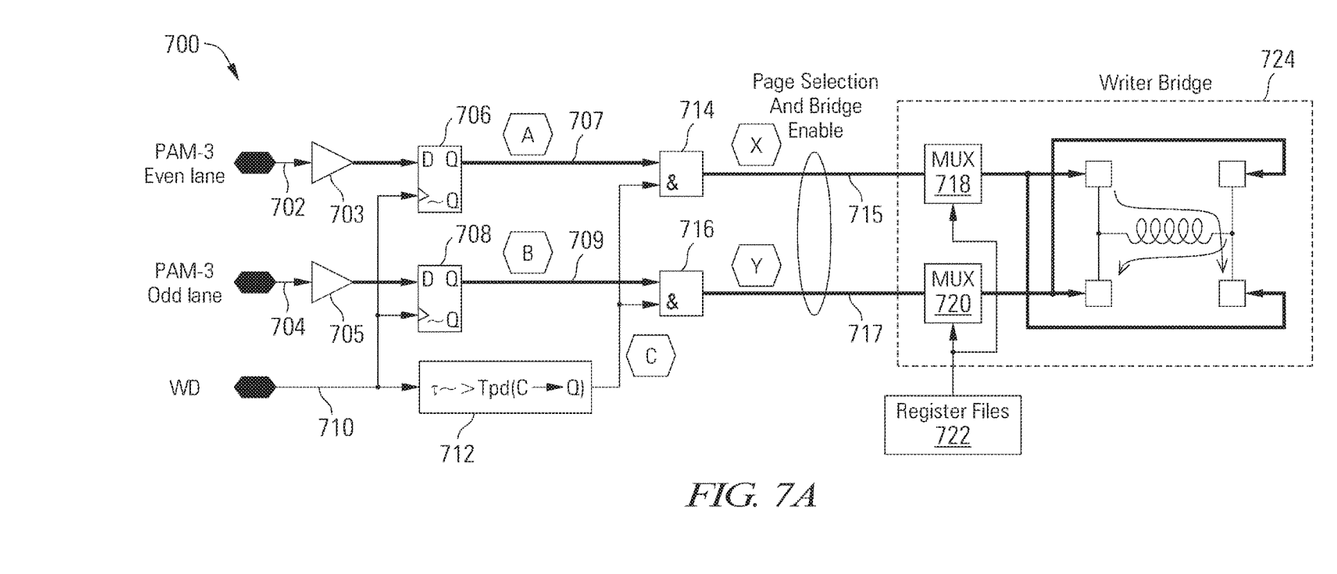
FIGS. 7A-7B depict a preamplifier writer circuit with two PAM-3 lanes and a corresponding timing diagram is depicted in accordance with some embodiments of the invention.
Figure 7B:
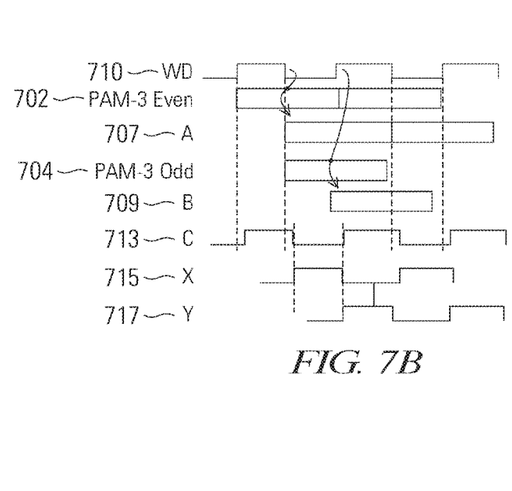

Embodiments of a two-lane PAM-3 signaling scheme between channel and preamplifier are depicted in FIGS. 6 and 7A, 7B. The two-lane PAM-3 scheme enlarges the write data to PDW_Sel timing window from the ±T/2 characteristic of single-lane signaling of FIG. 5, to ±T. Relative write data—to PDW_Sel timing is therefore relaxed.

Turning to FIG. 6, a magnet and timing diagram for a two-lane PAM-3 page selection signal is depicted in accordance with some embodiments of the present invention. In this embodiment, values on each of two PAM-3 lines are associated with alternate write data transitions, for example a first PAM-3 line 606 (referred to as an even PAM-3 line) is associated with falling write data edges and a second PAM-3 line 608 (referred to as an odd PAM-3 line) is associated with rising write data edges. A sequence 602 of 1T, 2T and 3T magnets is shown with a corresponding write data signal 604. The channel signals the magnet length to the preamplifier using the two PAM-3 lines 606, 608 of the page selection signal. The three states of each of the two PAM-3 lines 606, 608 are identified in FIG. 6 as Sel. 1T for 1T magnets, Sel. 2T for 2T magnets and Sel. Normal for ≥3T magnets. Assignment of PAM-3 {+1, 0, −1} voltages to each of these three states is arbitrary. Ignoring write data pre-compensation, the minimum timing margin around write data edges is nominally ±1T. However, to eliminate the need for maximum-magnet-length lookahead, in some embodiments PAM-3 values are set up ≥1T prior to the affected transition, not necessarily at the preceding transition. The use of two PAM-3 lanes for alternating write data edges provides a number of benefits. It provides a timing margin of ±T for the page selection signal PDW_Sel with respect to the write data signal WD. Due to the increased timing margins, the PAM-3 receiver power consumption is reduced, and timing calibration can be simplified or eliminated. It provides a wider eye by about a factor of two, supporting a simpler channel-side PAM-3 driver due to the wide eye. For example, in some embodiments pre-emphasis can be omitted due to the wider eye. In some embodiments, the system can be switched between single-lane and dual-lane PAM-3 modes. The ability to support one or two PAM-3 PDW_Sel lanes supports tradeoffs between data rate, power, and number of flex-circuit conductors. The single-lane configuration may be used at low data rates, characteristic of mobile disc drives, or in the inner zones of server-class drives; the benefit is reduced power, and fewer conductors joining channel and preamplifier. At lower rates, the ±T/2 timing between the page selection signal PDW_Sel and the write data signal WD is less troublesome, and the optimum PAM-3 state assignment of the table above can be applied. Operation with two PAM-3 lanes can be reserved for the highest data rates, characteristic of server-class drives: ±T timing is achieved, and the additional conductors are more easily accommodated on the larger flex-circuits of these drives.

Turning to FIGS. 7A-7B, a preamplifier writer circuit 700 with two PAM-3 lanes and a corresponding timing diagram are depicted in accordance with some embodiments of the invention. Based on the PAM-3 even lane 702 and the PAM-3 odd lane 704 and the write data signal WD 710, a write head is driven by a writer bridge 724. PAM-3 receivers 703, 705 receive the even and odd PAM-3 signals in the PAM-3 even lane 702 and the PAM-3 odd lane 704 and yield 2-bit binary signals shown as bold wires in FIG. 7B. Again, the state indicated by the 2-bit binary signals from the PAM-3 receiver 703 in the PAM-3 even lane 702 identify the magnet length of falling transitions in the write data, and thus the register page to be selected, 1T, 2T or Normal. The state indicated by the 2-bit binary signals from the PAM-3 receiver 705 in the PAM-3 odd lane 704 identify the magnet length of rising transitions in the write data, and thus the register page to be selected, 1T, 2T or Normal.

The 2-bit binary signals from the PAM-3 receivers 703, 705 are retimed in dual retiming flip flops 706, 708 according to the write data signal WD 710, yielding retimed 2-bit binary page selection signals 707, 709. The write data signal WD 710 is delayed by delay r 712 to yield delayed write data 713. The delayed write data 713 is combined with even lane page selection signal 707 in combination circuit 714 to yield left to right page selection and bridge enable signal 715. The delayed write data 713 is combined with odd lane page selection signal 709 in combination circuit 716 to yield right to left page selection and bridge enable signal 717. The page selection and bridge enable signals 715, 717 are 2-bit binary paths that change state with write data transitions, and which carry the page selection information enabling write current characteristics to be retrieved from the appropriate register page (1T, 2T or Normal) and applied to the page selection and bridge enable signals 715, 717 as they are applied to the write head through the writer bridge 724. Within writer bridge, diagonally-opposed drivers reverse head current on alternating transitions. Multiplexors 718, 720 (corresponding to FIG. 4, 452) and register files 722 (corresponding to FIG. 4, 402, 404, 406) are conditioned by the retimed PAM-3 signals to select the appropriate set of write parameters. The timing diagram of FIG. 7B depicts the relative timing of the various signals in the preamplifier writer circuit 700, although for clarity the pattern dependent write current variations due to signaled magnet lengths are not shown. Details of retrieving write current characteristics from the register pages (1T, 2T or Normal) and application of the write current characteristics in the writer bridge 724 are shown summarily in FIG. 7A for clarity in depicting the handling of the two lane PAM-3 signals. Again, the preamplifier/writer and pattern dependent write current parameter registers are not limited to use with any particular write current characteristics or to any particular number of characteristics. Write current characteristics can be varied in any manner desired, and based upon the disclosure provided herein, one of ordinary skill in the art will recognize a variety of circuits and techniques to modify write current based upon the pattern dependent register page selection signaling techniques disclosed herein in accordance with various embodiments of the present invention.

Thus, pattern dependent write current characteristics can be controlled in the preamplifier/writer using two PAM-3 ternary signals from the channel to the preamplifier to signal the magnet lengths separately for rising and falling write data transitions in ping pong fashion. This enables the channel to signal to the preamplifier different sets of pattern dependent write current characteristics to apply based on magnet lengths, while relaxing the timing margins around write data edges to at least 1T.

Further, in some embodiments, to eliminate the need for maximum magnet-length lookahead, PAM-3 values are set up ≥1T prior to the affected transition, not necessarily at the preceding transition. In other words, the PAM-3 generators set up on the sampling edge ±1T relative to that edge. Some magnets may be relatively very long, with tens of bit periods in length, which would introduce unacceptable latency if the PAM-3 generators had to include that tens of bit periods in their set up time. Thus, the PAM-3 generators may be set up on the sampling edge ±1T relative to that edge so that the eye width is set up ±1T ahead of the sampling transition.

Again referring to FIG. 7, since even and odd lanes are associated with specific write data polarities, it is possible within the writer to multiplex the outputs of PAM-3 receivers 703, 705 ahead of the retiming operation. Doing so reduces the number of internal writer page-selection lines from four to two, reducing routing congestion.

In some embodiments, pattern dependent write page selection signals PDW_Sel, used during write operations, can be multiplexed with read signals used during read operations, thereby reducing the number of traces in the flexcircuit between the channel and the preamplifier, particularly in two dimensional magnetic recording systems in which the read head includes an array of magnetoresistive sensors. For example, in some embodiments of a single channel reader, the PDW_Sel or clock signal and the read data signal from the read sensor can be multiplexed to share a single differential pair in the flexcircuit, reducing the number of differential pairs in the flexcircuit by one. In some embodiments of a two dimensional magnetic recording system with two read sensors and extended pattern dependent write, the write data and a first read data signal from a first sensor in the reader array can be multiplexed to share a first differential pair in the flexcircuit, and the PDW_Sel or clock signal and a second read data signal from a second sensor in the reader array can be multiplexed to share a second differential pair in the flexcircuit where the PDW_Sel is a ternary signal. In some embodiments of a two dimensional magnetic recording system with three read sensors and extended pattern dependent write, the write data and a first read data signal from a first sensor in the reader array can be multiplexed to share a first differential pair in the flexcircuit. Where the PDW_Sel uses two bit binary signaling, the two PDW_Sel bits and read data signals from the second and third sensors in the reader array can be multiplexed to share second and third differential pairs in the flexcircuit. Where the PDW_Sel uses ternary signaling, it can be multiplexed with the read data signals from the second or third sensors in the reader array to share the second or the third differential pair in the flexcircuit. Thus, in a two dimensional magnetic recording system with three read sensors, the extended pattern dependent write signaling disclosed herein can be implemented without adding any additional differential pairs to the flexcircuit.

Figure 8:
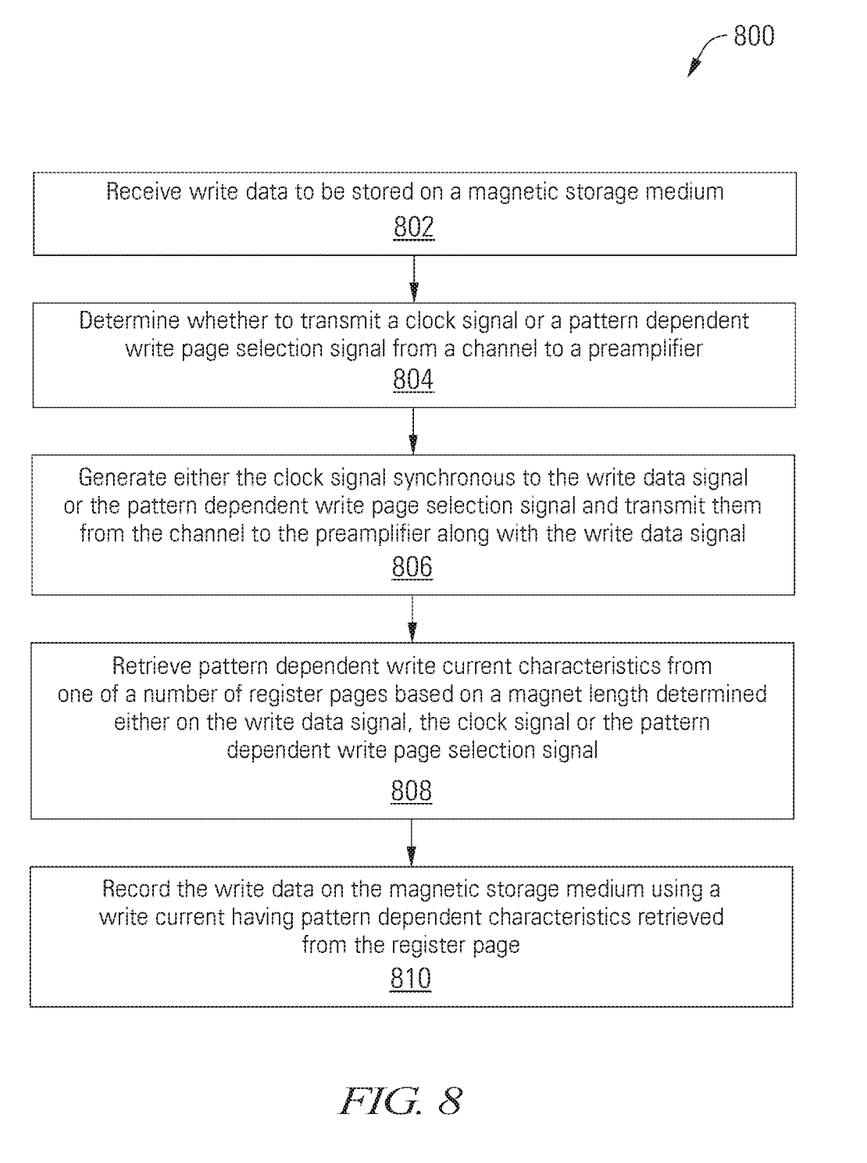
FIG. 8 depicts an operation for writing data with extended pattern dependent write in a magnetic recording system in accordance with some embodiments of the invention.

Turning to FIG. 8, flow diagram 800 depicts an operation for writing data with extended pattern dependent write in a magnetic recording system in accordance with some embodiments of the invention. Following flow diagram 800, write data is received to be stored on a magnetic storage medium. (Block 802) A determination is made as to whether to transmit a clock signal or a pattern dependent write page selection signal from a channel to a preamplifier. (Block 804) In some embodiments, the system can operate in a timer mode in which the preamplifier/writer operates independently of the channel, in which case timers within the preamplifier/writer recognize magnet lengths in the write data to select pattern dependent write characteristics. The system can also operate in a clocked mode, in which the channel provides a continuous clock synchronous to the write data to the preamplifier. The system can also operate in a channel mode, in which the channel provides a page selection signal indicating the length of magnets in the write data. The channel generates either the clock signal synchronous to the write data signal or the pattern dependent write page selection signal and transmits them from the channel to the preamplifier along with the write data signal. (Block 806)

In some embodiments, signals from the channel to the preamplifier are transmitted on a flexible circuit using differential traces. In some embodiments, the pattern dependent write page selection signal is transmitted using a number of binary signals. In some other embodiments, the pattern dependent write page selection signal is transmitted using ternary signals, such as, but not limited to, PAM-3 signals. In some embodiments, the pattern dependent write page selection signal is differentiated into multiple lanes, one to identify the magnet length for falling transitions in the write data and the other to identify the magnet length for rising transitions in the write data, thereby reducing the frequency and the timing requirements of the pattern dependent write page selection signal. In some embodiments, signals are multiplexed with read operation signals onto traces on the flexible circuit so that read related signals and write related signals share the same conductive traces on the flexible circuit, with signals being connected to the traces depending on whether a read operation or a write operation is taking place.

Pattern dependent write current characteristics are retrieved from one of a number of register pages based on a magnet length determined either on the write data signal, the clock signal or the pattern dependent write page selection signal. (Block 808) In some embodiments, write current characteristics for 1T magnets, 2T magnets, and other length magnets to be written are each retrieved from different register pages. The magnet lengths can be determined in the channel or preamplifier in different manners depending upon the operating mode. In the timer mode, timers in the preamplifier determine the magnet length from the write data transmitted from the channel. In the clocked mode, a pattern detector in the preamplifier identifies the magnet lengths based on the write data signal and the clock signal received from the channel. In the channel mode, pattern recognition logic in the channel identifies the magnet lengths and transmits an indication of the magnet lengths to the preamplifier using the pattern dependent write page selection signal. The write data is recorded on the magnetic storage medium using a write current having pattern dependent characteristics retrieved from the register page. (Block 810) The register pages can be preloaded with write characteristics in any suitable manner, such as, but not limited to, using a relatively slow serial bus. Write current characteristics stored in the register pages in the preamplifier can include any number and any type of characteristics, such as, but not limited to, DC write current IWDC, delta DC write current ΔIWDC, overshoot current IOS, delta overshoot current ΔIOS, IWDC rise/fall time $TRTF_{IWDC}$, IOS rise/fall time $TRTF_{IOS}$, and overshoot pulsewidth $T_{OS}$ 316 of the bit being written.

The extended pattern dependent write system and channel-preamplifier communication means disclosed herein includes a multi-page pattern dependent write scheme allowing distinct write parameter sets (pages) to be specified for 1T, 2T, and other magnet lengths. Note that magnet-length definition is flexible. More than three pages can be employed. In some embodiments, a page selection signal PDW_Sel communicates information between the channel and preamplifier using bussed signaling, for example using two binary signals. In some other embodiments, the page selection signal PDW_Sel communicates information between the channel and preamplifier using ternary signaling, for example using PAM-3 signaling, thereby reducing or conserving the signal count. Some embodiments of the extended pattern dependent write system and channel-preamplifier communication means use a long initial page selection signal PDW_Sel to write data interval and average trailing-edge timing. In some embodiments, ternary page selection signal PDW_Sel levels are mapped to magnet lengths as shown in Table 1 to achieve maximum eye margins when using a single trace in the flexcircuit. In some embodiments, the page selection signal PDW_Sel is divided into multiple lanes, one to identify the magnet length for falling transitions in the write data and the other to identify the magnet length for rising transitions in the write data, thereby reducing the frequency and the timing requirements of the pattern dependent write page selection signal relative to the single-lane interface. In some of these embodiments, the channel and preamplifier can switchably be configured between single-lane and multiple lane PDW_Sel signals. In some embodiments, signals are multiplexed with read operation signals onto traces on the flexible circuit so that read related signals and write related signals share the same conductive traces on the flexible circuit, with signals being connected to the traces depending on whether a read operation or a write operation is taking place.

It should be noted that storage system 100 may be integrated into a larger storage system such as, for example, a RAID (redundant array of inexpensive disks or redundant array of independent disks) based storage system. It should also be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that some functions of the blocks, systems or circuits discussed herein may be implemented in either software or firmware. In some such cases, a part of a given system, block or circuit may be implemented in software or firmware, while other parts are implemented in hardware.

In conclusion, embodiments of the present invention provide novel systems, devices, methods and arrangements for an extended pattern-dependent writer in a magnetic recording system and for methods and means of communication with a preamplifier in the system. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:
1. A storage system, comprising:
   a magnetic write head;
   a magnetic storage medium;
   a channel circuit comprising a write data output, wherein the channel circuit is operable to process write data to be recorded on the magnetic storage medium by the magnetic write head; and
   a preamplifier operable to receive the write data from the channel circuit, wherein the preamplifier comprises a plurality of register pages configured to store pattern dependent write current characteristics for a plurality of magnet lengths, and wherein the preamplifier is operable to retrieve the write current characteristics based on magnet lengths and to record data bits on the magnetic storage medium using the write current characteristics,
   wherein the channel circuit and the preamplifier operate in a plurality of operating modes, comprising a clocked mode wherein the magnet lengths are determined based on the write data and on a clock signal from the channel circuit, and a channel mode wherein the magnet lengths are determined based on a pattern dependent write page selection signal from the channel circuit.

2. The storage system of claim 1, wherein the preamplifier comprises a pattern detection circuit operable to determine the magnet lengths in the write data, and wherein the channel circuit comprises a clock signal output connected to a clock signal input on the preamplifier, and wherein the pattern detection circuit is clocked by the clock signal received from the channel circuit on the clock signal input.

3. The storage system of claim 1, wherein the channel circuit comprises a pattern detection circuit operable to determine the magnet lengths in the write data.

4. The storage system of claim 3, wherein the pattern dependent write page selection signal comprises a plurality of bussed binary signals.

5. The storage system of claim 3, wherein the pattern dependent write page selection signal comprises at least one ternary signal.

6. The storage system of claim 5, wherein the pattern dependent write page selection signal comprises a single ternary signal and wherein states of the ternary signal are mapped to magnet lengths to maximize eye margins.

7. The storage system of claim 3, wherein the pattern dependent write page selection signal comprises a multi-lane signal having a first ternary signal representing magnet lengths for rising edges of the write data and a second ternary signal representing magnet lengths for falling edges of the write data.

8. The storage system of claim 7, wherein the channel circuit and the preamplifier are configured to switch between multi-lane ternary pattern dependent write page selection signals and a single-lane ternary pattern dependent write page selection signal.

9. The storage system of claim 1, wherein in the clocked mode the magnet lengths are determined in the preamplifier by a pattern detection circuit based on the write data and on the clock signal, and in the channel mode the magnet lengths are determined in the channel circuit.

10. The storage system of claim 9, wherein the clock signal and the pattern dependent write page selection signal are multiplexed onto same conductors of a flexible circuit between the channel circuit and the preamplifier.

11. The storage system of claim 1, wherein at least some write operation signals and read operation signals between the channel circuit and the preamplifier are multiplexed onto same traces on a flexible circuit.

12. The storage system of claim 1, wherein the channel is configured to apply pre-compensation to the write data.

13. A method of writing data to a magnetic storage device, the method comprising:
- receiving write data to be recorded on a magnetic storage device;
- determining magnet lengths in the write data based on the write data and a clock signal in a first operating mode of the magnetic storage device, and based on a pattern dependent write register page selection signal in a second operating mode of the magnetic storage device;
- retrieving pattern dependent write current characteristics from one of a plurality of register pages in a writer based on the magnet lengths in the write data; and
- recording the write data on the magnetic storage device according to the pattern dependent write current characteristics retrieved from the register pages.

14. The method of claim 13, further comprising determining whether to transmit the clock signal or the pattern dependent write register page selection signal from a channel circuit to a preamplifier.

15. The method of claim 13, further comprising identifying the magnet lengths in the channel circuit and transmitting the pattern dependent write register page selection signal to a preamplifier to signal the magnet lengths.

16. The method of claim 15, wherein the pattern dependent write register page selection signal comprises a PAM-3 ternary signal.

17. The method of claim 15, wherein the pattern dependent write register page selection signal comprises a multi-bit binary bussed signal.

18. The method of claim 15, wherein the pattern dependent write register page selection signal comprises a multi-lane PAM-3 ternary signal in which a plurality of lanes in the ternary signal are divided by their correspondence to rising write data edges and falling write data edges.

19. The method of claim 15, wherein the pattern dependent write register page selection signal uses average trailing edge timing.

20. A data processing system comprising:
- means for determining magnet lengths in write data to be stored on a magnetic storage device, wherein the magnet lengths are determined using a clock signal and the write data in a first mode and the magnet lengths are determined using a selection signal in a second mode;
- means for storing pattern dependent write current characteristics organized by the magnet lengths, wherein the means for storing includes a plurality of register pages;
- means for retrieving the pattern dependent write current characteristics based on the magnet lengths; and
- means for recording the write data on the magnetic storage device based at least in part on the pattern dependent write current characteristics.

* * * * *